(12) United States Patent
Borrego Lebrato et al.

(10) Patent No.: US 11,815,125 B2
(45) Date of Patent: Nov. 14, 2023

(54) DEVICES FOR RETAINING ARTICLES

(71) Applicant: Hewlett-Packard Development Company, L.P., Spring, TX (US)

(72) Inventors: Alberto Borrego Lebrato, Sant Cugat del Valles (ES); Marc Clotet Marti, Sant Cugat del Valles (ES); Cesar Luis Coelho Morais de Serpa Rosa, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 98 days.

(21) Appl. No.: 17/416,545

(22) PCT Filed: Apr. 8, 2019

(86) PCT No.: PCT/US2019/026374
§ 371 (c)(1),
(2) Date: Jun. 21, 2021

(87) PCT Pub. No.: WO2020/209834
PCT Pub. Date: Oct. 15, 2020

(65) Prior Publication Data
US 2022/0082118 A1 Mar. 17, 2022

(51) Int. Cl.
*F16B 5/06* (2006.01)
*B41J 29/54* (2006.01)

(52) U.S. Cl.
CPC ............ *F16B 5/0664* (2013.01); *B41J 29/54* (2013.01)

(58) Field of Classification Search
CPC ................................. F16B 5/0664; B41J 29/54
See application file for complete search history.

(56) References Cited

U.S. PATENT DOCUMENTS

| | | | | |
|---|---|---|---|---|
| 4,534,088 A | * | 8/1985 | Ricke ................... | F16B 5/0664 24/297 |
| 4,579,478 A | * | 4/1986 | Takahashi ............. | F16B 5/0664 24/453 |
| 4,584,757 A | * | 4/1986 | Adlon ................... | H01R 43/01 29/564.6 |
| 5,115,555 A | * | 5/1992 | Olsson ................. | H01R 12/778 29/749 |
| 5,535,969 A | * | 7/1996 | Duffy, Jr. ................ | F16L 3/237 248/68.1 |
| 5,613,655 A | * | 3/1997 | Marion ................. | F16L 3/2235 24/339 |

(Continued)

FOREIGN PATENT DOCUMENTS

JP 2003137456 5/2003
JP 2011230903 11/2011
(Continued)

*Primary Examiner* — David M Upchurch

(57) ABSTRACT

An example retaining device includes a retaining feature to retain an article, and a first arm. The first arm projects in a first direction and includes a first protrusion extending away from a first face of the first arm. The first protrusion is to engage another article to retain the retaining device relative to the other article. The first arm includes a second protrusion spaced apart from the first protrusion and extending away from the first face of the first arm. The width of the second protrusion increases in the first direction so as to provide a sloped surface.

15 Claims, 12 Drawing Sheets

(56) References Cited

U.S. PATENT DOCUMENTS

| | | | | |
|---|---|---|---|---|
| 6,301,112 B1* | 10/2001 | Lee | ............ | H01L 23/4093 |
| | | | | 174/16.3 |
| 6,513,205 B1* | 2/2003 | Mathieu | ............ | B65D 73/0007 |
| | | | | 24/570 |
| 7,117,927 B2* | 10/2006 | Kent | ............ | F28F 9/002 |
| | | | | 24/458 |
| 8,350,881 B2 | 1/2013 | Ochiai et al. | | |
| 8,966,983 B2 | 3/2015 | Schoen | | |
| 9,329,553 B2 | 5/2016 | Taniguchi | | |
| 9,676,297 B2* | 6/2017 | Peniche | ............ | B60N 2/0725 |
| 2007/0116537 A1* | 5/2007 | Glovak | ............ | F16B 5/0664 |
| | | | | 411/45 |
| 2008/0011930 A1* | 1/2008 | Nagai | ............ | B60Q 3/51 |
| | | | | 248/503 |
| 2011/0291427 A1* | 12/2011 | Lesjak | ............ | E05C 19/026 |
| | | | | 292/228 |
| 2012/0187722 A1* | 7/2012 | Dawe | ............ | F16B 5/0664 |
| | | | | 24/289 |
| 2012/0272487 A1* | 11/2012 | Cooley | ............ | F16B 19/1081 |
| | | | | 24/289 |
| 2016/0129854 A1* | 5/2016 | Bachelder | ............ | B60R 13/0206 |
| | | | | 24/292 |
| 2017/0059814 A1* | 3/2017 | Lang | ............ | B60R 1/00 |
| 2017/0350433 A1* | 12/2017 | Shin | ............ | F16B 5/0664 |
| 2018/0310421 A1* | 10/2018 | Kato | ............ | H05K 5/0247 |
| 2020/0011357 A1* | 1/2020 | Fukami | ............ | H02G 3/32 |
| 2020/0068723 A1* | 2/2020 | Miklosi | ............ | H05K 5/0013 |
| 2020/0288582 A1* | 9/2020 | Maurech | ............ | H05K 5/0221 |
| 2020/0318665 A1* | 10/2020 | Lu | ............ | F16B 5/0635 |
| 2021/0301851 A1* | 9/2021 | Moore | ............ | F16B 5/0664 |

FOREIGN PATENT DOCUMENTS

| | | |
|---|---|---|
| RU | 1335666 A1 | 9/1987 |
| RU | 2489346 C2 | 8/2013 |
| WO | WO-WO2000068607 A1 | 11/2000 |
| WO | WO-WO2011092259 A1 | 8/2011 |

* cited by examiner

500

- engaging release tool with second protrusion of the device — 502
- moving the release tool — 504

DEVICES FOR RETAINING ARTICLES

BACKGROUND

Some devices may retain an article respect to another articles, for example a device may retain an article with respect to an apparatus.

BRIEF DESCRIPTION OF DRAWINGS

Examples will now be described, by way of non-limiting example, with reference to the accompanying drawings, in which.

DETAILED DESCRIPTION

Figure 1B:
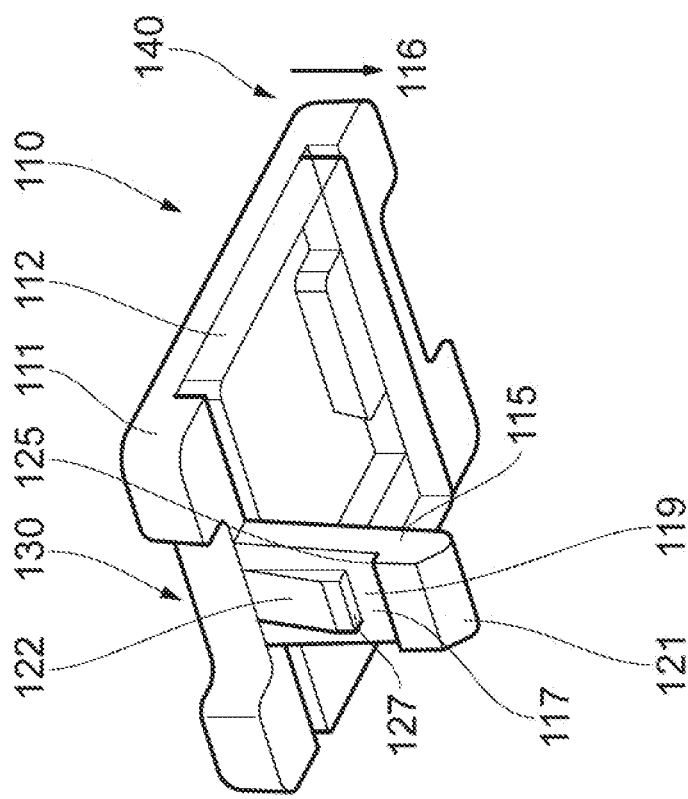
FIGS. 1A and 1B are, respectively, perspective topside and underside views of an example device.

When a device retains an article relative to another article, the article retained by the device may need to be periodically removed, for example to be cleaned. For example the article retained by the device may comprise a mechanical, electrical, or electromechanical component, and such components may need to be removed to be repaired or serviced. Some examples herein relate to a device that is capable of retaining an article (such as a mechanical, electrical, or electromechanical component) that is able to be retained relative to another article, but then moved relative to the other article when an engagement mechanism is released.

According to some examples the device is to retain a window relative to a printing apparatus, for example a print platen of a printing apparatus. In some printing systems an optical media advance sensor is provided to navigate and control a print media as the print media advances through the printing system. Such a media advance sensor is placed in the print zone of the printing system so that the sensor is located where the printing occurs, and is therefore able to sense the media as printing takes place. In this way, the sensor is optimally located to control the media advance in the printing system. However, in some examples, as the sensor is located in the print zone it is exposed to ink drops, aerosol, scratches and media fibres (particularly when the print media comprises a fabric substrate) and in these examples a protective window is utilised to cover, and therefore protect, the optical sensor. The window may comprise glass or plastic and is to permit an optical beam of the optical sensor to pass therethrough. However, the window may need periodic cleaning and/or replacing. Particularly in examples where a fabric substrate is used, as these substrates are porous, ink may pass through the substrate and deposit onto the window (or other fibres may cause the window to become dirty) and cleaning may be needed frequently. If the window is covered this will interfere with the optical sensor, which may not be able to properly navigate the media, which in turn may lead to media advance errors and printing quality problems. The window may also get scratched or otherwise damaged by tough textile fibres. If the window is permanently or semi-permanently attached to (for example welded, glued, or otherwise attached to, for example using screws) then reliable removal and replacement of the window may need the service of a professionally qualified service engineer (a user attempting to tighten any screws used to secure the window themselves, for example, may risk altering the torque applied to the window which may be dangerous). A service engineer may also be needed when the window is secured to the platen using complex mechanisms and/or moving parts to ensure a proper connection and an adequate relative positioning between the window, the sensor and the rest of the printing system, for example, a print platen.

Utilising the device according to some examples herein, the window maybe retained in the device relative to the print platen and may be moved relative to the print platen (e.g. removed) when necessary. Although some examples of the device described herein have utility when retaining a (protective) window of a printing system relative to a print platen it will be appreciated that the device described herein finds more general applications, and indeed any article may be retained by the device relative to any other article.

Some examples of the device described herein comprise a dual engagement mechanism, for example a primary engagement and a secondary engagement. The primary engagement is to engage the device (or retain the device) relative to another article and the secondary engagement is to engage the device (or retain the device) to a release tool and also to release the primary engagement. Engagement between the release tool and the secondary engagement therefore functions not only to retain the device to the release tool but also to release the primary engagement, thereby releasing the engagement between the device and the other article. This allows the device (and therefore an article retained thereto, such as a protective window as described above) to be reliably moved relative to (e.g. removed from) another article, such as an apparatus, so that any articles (e.g. the window) retained by the device may then be removed and serviced. Thereafter, the article (e.g. a window) may be placed in the device and the device may be placed in the apparatus, and via the primary engagement mechanism the device (and article retained thereto) may be retained, or held, relative to the apparatus.

In some examples both the primary engagement and the secondary engagement are snap-fits. For example, the primary engagement is to retain the device relative to another article via a snap-fit, and the secondary engagement is to retain the device relative to a release key via a snap-fit. In these examples to release either one of the primary or secondary engagements the snap-fits must be released. Also in these examples, the snap-fit engagement between the device and the release tool causes the snap-fit between the device and the other article to be removed. The primary engagement may therefore be considered as a primary snap and the secondary engagement may therefore be considered as a secondary snap, the primary snap enabling correct assembly of the device relative to another article (e.g. a print platen) and the secondary snap enabling the removal of the device from the other article by loosening the primary snap. The secondary snap therefore allows a user to remove the device (and therefore an article retained thereto or therein, such as a window) in a quick, easily, reliable and robust way, either for cleaning or replacement of the article, and the primary snap allows the device (with the cleaned or replaced article) to be quickly, easily, reliably and robustly replaced.

In some examples, as will now described with reference to the Figures, the primary engagement comprises a first protrusion and the secondary engagement comprises a second protrusion, each protrusion being provided on an arm of the device. In other examples, the primary engagement comprises a first and third protrusion and the secondary engagement comprises a third and fourth protrusion, the first and second protrusions being provided on a first arm of the device and the third and fourth protrusions being provided on a second, opposing, arm of the device.

Figure 1A:
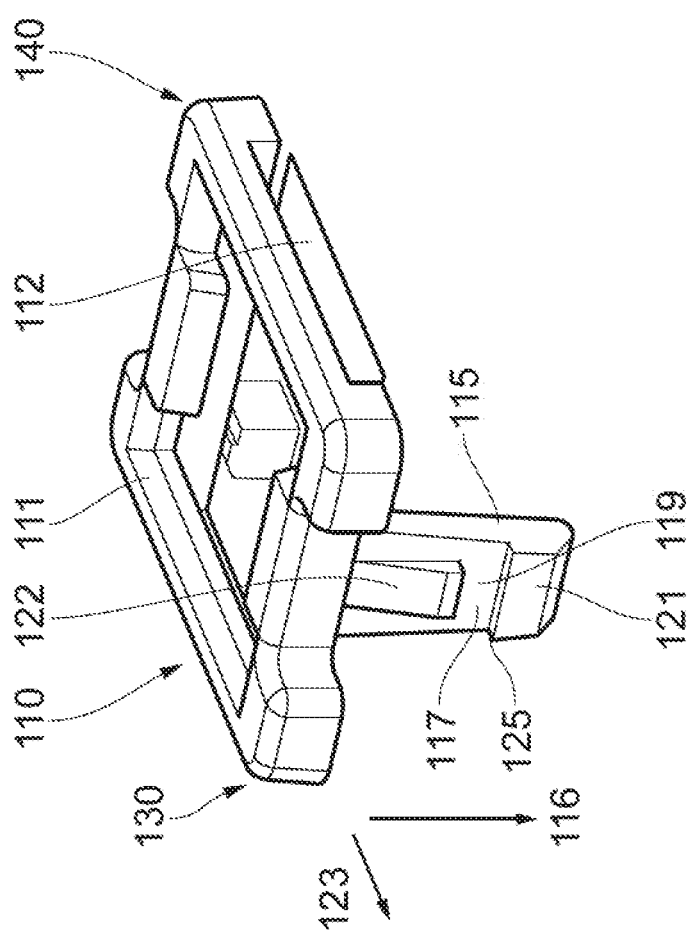

FIGS. 1A and 1B respectively show perspective views of a topside and an underside of a retaining device 110. The retaining device 110 comprises a retaining feature 112 that is to retain an article (not shown in FIG. 1A or 1B). Any suitable retaining feature may be provided (as will be explained later) but for illustrative purposes the retaining feature 112 is depicted in FIGS. 1A and 1B as a slot 112 to receive an article and to retain the article therein, e.g. via a friction, press, or interference fit. In other words, the dimensions of the slot 112 (or a gap defining an entry to the slot 112) may be approximately equal to, or slightly less than, the dimensions of the article that the slot is to retain so that the article, when inserted in the slot, is held within the slot.

The retaining device (hereafter the "device") 110 comprises a first arm 115. The first arm 115 projects in a first direction 116. In other words, the first arm 115 may comprise a dimension (e.g. a length or depth) extending in the first direction 116, or may comprise a part of the device 110 that projects away from a body 111 of the device in the first direction 116. The first arm 115 comprises a first face 117. In this example the first face 117 comprises a plane, and the first direction 116 is parallel to the plane (or contained in the plane). The first face 117 may face away from the body 111 of the device 110, as shown in FIGS. 1A and 1B. The device 110 comprises a first protrusion 121 and a second protrusion 122. The first protrusion 121 extends away from the first face 117 and (as will be described later) is to engage another article to retain the device 110 relative to the other article. The second protrusion 122 is spaced part from the first protrusion 121 in the first direction 116 and extends away from the first face 117 of the first arm 115. In other words, the first face 117 comprises a plane defining a perpendicular axis 123, being an axis (and therefore a direction) perpendicular to the first face 117, and each of the first and second protrusions 121, 122 extends away, or protrudes, from the first arm 115 in the perpendicular direction 123. The width of the second protrusion 122 increases in the first direction 116 so that the second protrusion 122 comprises a sloped surface. The width of the second protrusion 122 may be defined as the dimension of the second protrusion in the perpendicular direction 123 and therefore the dimension of the second protrusion 122 increases in the first direction 116 to provide the sloped surface. As shown in FIGS. 1A and 1B, the width of the second protrusion 123 may increase in the first direction, e.g. toward the first protrusion 121 (e.g. the further along the first direction the more increased the width (in the parallel direction). The width of the second protrusion 123 may therefore increase in the direction that the first arm 115 protrudes away from a body 111 of the device 110. Although the sloped surface of the second protrusion is depicted in this example as a linear slope, so that the second protrusions resembles a triangular prism, other examples may feature a second protrusion of another shape, for example the slope of the second protrusion may not be linear and the second protrusion may in one example be of a hemispherical shape. In some examples the second protrusion may comprise a cammed surface, or be shaped so as to provide a cammed surface, such that a camming action is provided when a release tool engages the cammed surface of the second protrusion so as to urge the first protrusion out of engagement with the other article.

As will be explained below, the first and second protrusions 121, 122 define a space 119 therebetween for receipt of part of another article. The first protrusion 121 may be to engage part of the other article by receiving part of the other article in the space 119, and the engagement between the part of the other article and the first protrusion may be via a snap fit. In other words, the protrusion 121 may define a shoulder 125 of the first arm 115 (and therefore of the device 110) such that when the device is retained by another article, part of the other article may be received in the space 119 and may abut the shoulder 125 of the first arm 115. In this example, if the device 110 were attempted to be moved relative to the other article, engagement between the other article and the shoulder 125 of the first arm 115 may prevent this relative movement. In other words, the engagement between the first protrusion 121 and the other article may, in some examples, need to be disengaged before relative movement between the device 110 and other article is permitted. As will also be explained in more detail below, engagement between a release tool and the second protrusion may cause the first protrusion and other article to disengage to facilitate relative movement between the device and the other article. Similarly, the second protrusion 122 comprises a shoulder 127 that, as will be explained below, may be to engage a release tool to facilitate movement of the device 110 by moving the release tool. In other words, when part of a release tool engages the shoulder 127 of the second protrusion 122 movement of the release tool may cause the device 110 to move, and in some examples this will allow removal of the device from the other article.

The first arm 15, as is shown in FIGS. 1A and 1B may be provided at a first end 130 of the device. The device 110 may comprise a second end 140 opposite the first end 130. As will be described below with reference to examples shown in other figures, the second end 140 of the device 110 may comprise an attachment means to enable the device 110 to be attached to another article (such as a platen of a print apparatus), for example the second end 140 of the device may comprise a hinge, or pivot, and the device may be moveable relative to the other article about the pivot. This will now be described with reference to FIGS. 2A and 2B.

Figure 2B:
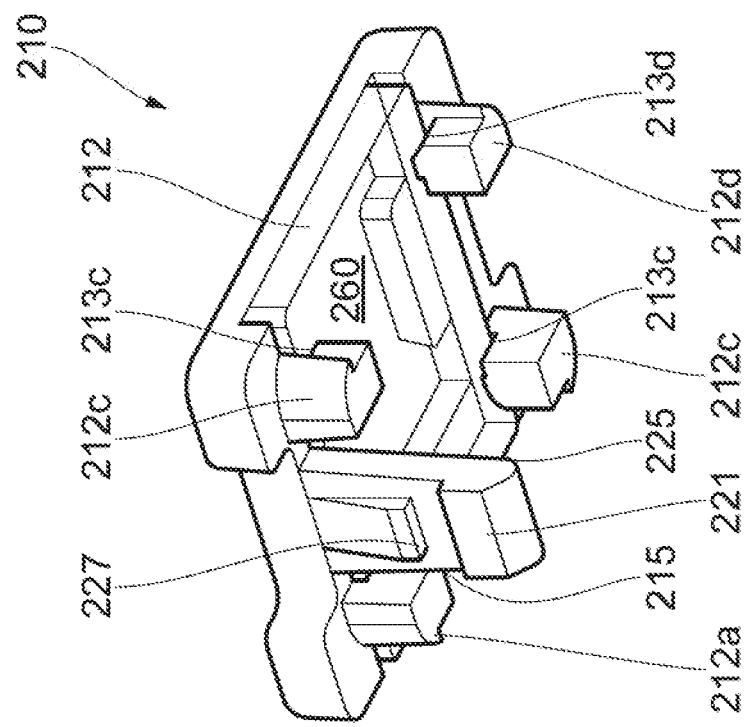
FIGS. 2A and 2B are, respectively, perspective topside and underside views of an example device.
Figure 2A:
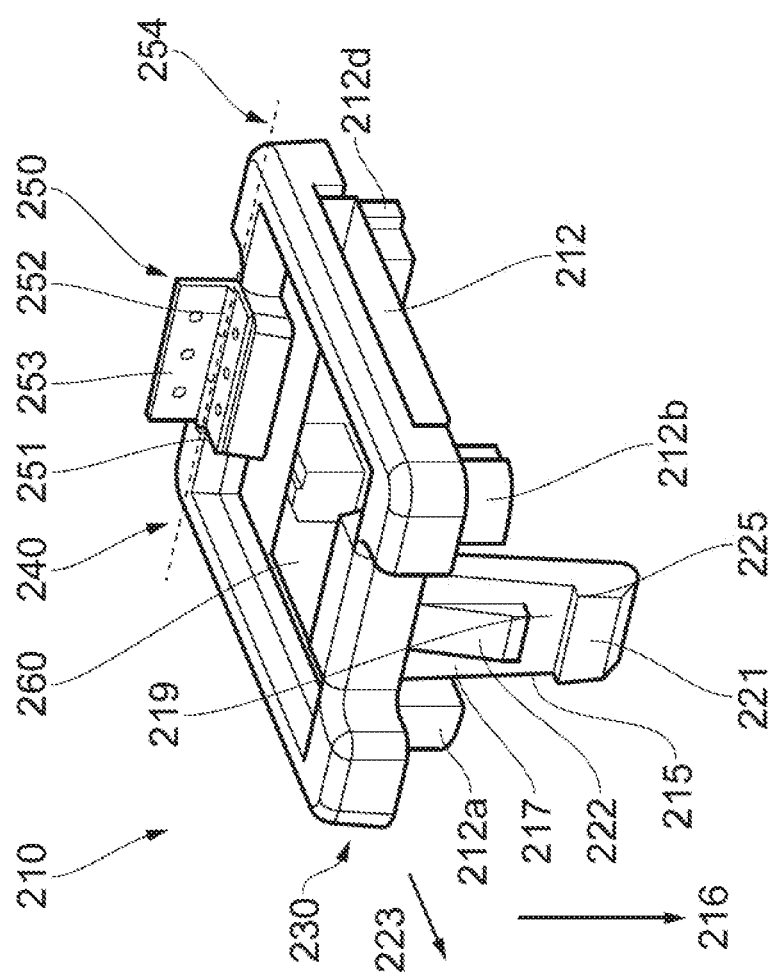

FIGS. 2A and 2B respectively show perspective views of a topside and an underside of another example retaining device 210. The example device 210 shown in FIGS. 2A and 2B is identical to the device shown in FIGS. 1A and 1B (and, to avoid unnecessary repetition of text, like features are denoted with the same references numerals but increased by 100, so that 121 and 221 refer to generally the same feature etc.) but for the following features to be described.

The device 210 comprises a retaining feature, which comprises a slot 212, and at least one tab (four of which are depicted 212a, 212b, 212c, 212d). Each tab comprises a retaining lip 213a-d to reduce or prevent relative movement between an article being retained in the slot 212 and the device 210. In other words, the tabs and lips 212*a*-*d*, 213*a*-*d* provide a "base" for the slot 212 to prevent an article received in the slot from effectively falling out of the slot rather than relying on a friction fit. In this way the retaining feature of the device 210 comprises a shelf. In the example of FIGS. 2A and 2B, the article is depicted as a (see-through) window 260 being slidably received in the slot 212 and being retained by the retaining tabs and retaining lips 212*a*-*d*, 213*a*-*d*. In other words, the article may comprise a window 260. In another example the retaining tabs may not be provided and the retaining lips 213*a*-*d* may extend outwardly directly from the body of the device 210. It will be appreciated that the example retaining features 112 and 212, described with reference to FIGS. 1 and 2, respectively, are merely illustrative and the retaining feature of either one of the devices 110 or 210 may be different in other examples. For example, the retaining feature of the device 110 or 210 may comprise an adhesive or bonding to permanently or semi-permanently attach or secure an article to the device 110, 210. The retaining feature may comprise a pouch or other feature whose purpose is the retention of another article. In some examples, the article may be integral with the remainder of the device 110, 210. For example, the device may be to retain a window, such as a window comprising plastic and/or glass. In these examples, the window may be integrally formed with the device (for example the entirety of the device may be made of see-through plastic and therefore part of the device may constitute the window) in which case the retaining feature may be the part of the device surrounding the portion identifiable as the 'window'. In other examples, the window may be a glass piece and may be slid into the slot 112 or 212 of the devices 110 or 210. The window in this example may therefore comprise a glass or plastic material.

As for the device 110, the first arm 215 of the device 210 shown in FIGS. 2A and 2B is at a first end 230 of the device 210. Unlike the device 110 in the FIG. 1 example, the second end 240 of the device 210 comprises a means of attachment to another article, shown in FIG. 2A as a hinge 250 attached to the device 210 at a second end 250 of the device 210. In other words, the device 210 may comprise a means of attachment at an end 240 of the device opposite the end 230 at which the first arm 215 is located. The hinge 250 may comprise a first hinge portion 251 that is attached to the device 210 (e.g. at the second end 240) and a second hinge portion 253 that is to be attached to another article (not shown). The two hinge portions 251 and 253 are joined at a hinge barrel 252 and each hinge portion 251, 253 is moveable (e.g. pivotable) about the hinge barrel 252. When the first hinge portion 251 is attached to the device 210, as shown in FIG. 2A, the device 210 is therefore moveable (e.g. pivotable) about the barrel 252. The barrel 252 therefore defines a pivot axis 254 and, the device 210 is therefore moveable (e.g. pivotable) about the pivot axis 254. It will therefore be appreciated that the device 210, if attached to another article, e.g. if the other article is attached to the second hinge portion 253, may be moveable (e.g. pivotable) about the other article. This will now be described with reference to FIG. 3.

Figure 3:
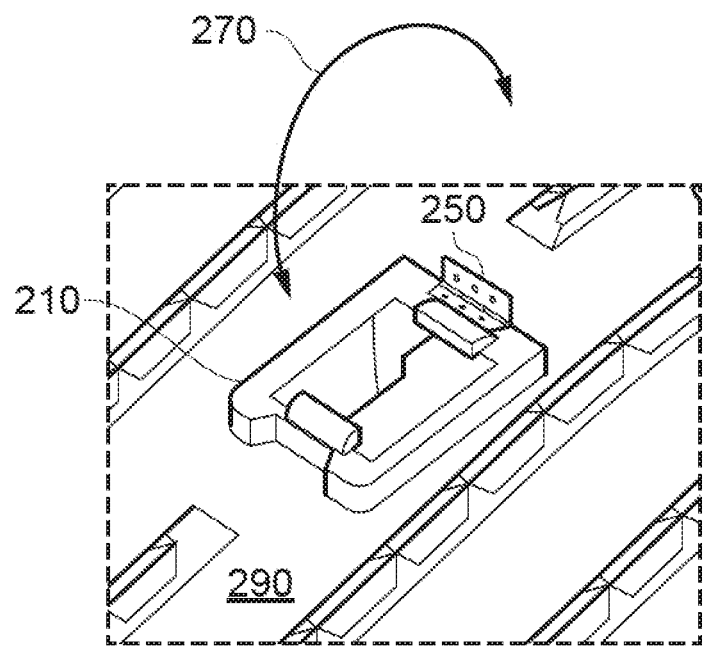
FIG. 3 shows the device of FIGS. 2A and 2B retained in another article.

FIG. 3 shows the device 210 being received in another article 290. As shown in FIG. 3 the device 210 is attached to the other article 290 via the hinge 250. In other words, the first hinge portion 251 is attached to the device 210 and the second hinge portion 253 is attached to the other article 290 such that the device 210 is pivotable about the pivot axis, and therefore is moveable as shown by the arrow 270. It will therefore be appreciated that when the first protrusion 221 is engaged to the other article (e.g. the shoulder 223 may be engaged with part of the other article) this pivotable movement may be prevented. In other words, despite the device 210 being pivotable relative to another article about the axis 254, engagement between the device 210 (at the first protrusion 221 thereof) and the other article may prevent this movement, until such time as the engagement between the first protrusion 221 and the other article is released. Releasing this engagement will be described with reference to FIG. 5. Engagement between the first arm 215 and the other article 290 will now be described with reference to FIG. 4.

Figure 4:
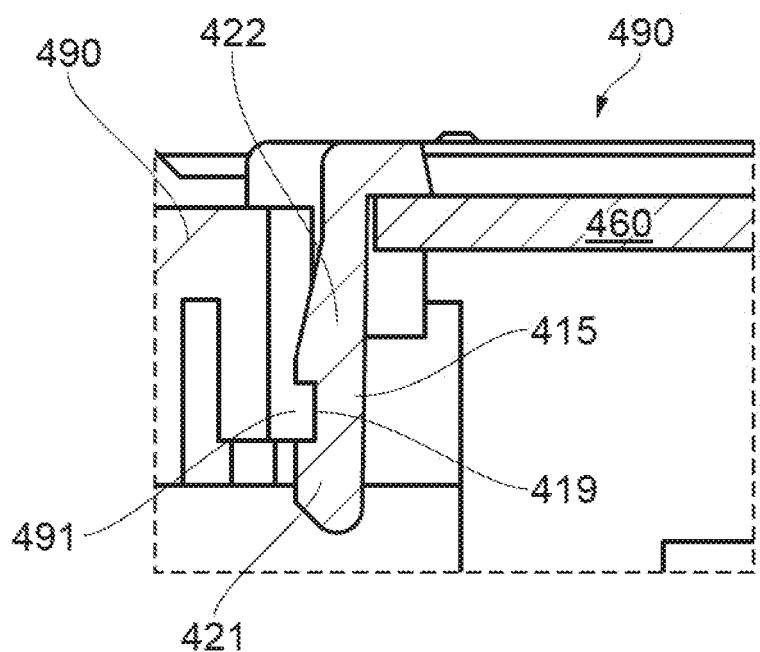
FIG. 4 shows a cross-section of an example device retained in another article.

FIG. 4 depicts a cross-section of a first end 430 of a retaining device 410 (which may be the device 110 or 210, and therefore like parts are given like reference numerals, increased by a factor of 100). The device 410 comprises a first arm 415, and first and second protrusions 421, 422 as described above with reference to FIGS. 1 and 2. The device 410 is shown retaining another article 460 (which may, as described above, comprise a mirror or in other examples may comprise another device, such as a mechanical, electrical, or electromechanical device) and engaged with another article 490. The other article 490 may comprise a platen of a printing system. The other article 410 comprises a tab 491 which is shaped so as to fit in the space 419 between the first and second protrusions 421, 422. It will be appreciated that, to engage the device 410 with the article 490 the device 410 is first inserted downwards (with reference to FIG. 4) until a tab 491 of the other article 490 is received in the space 419 and therefore is engaged with the device 410. The first protrusion 421 of the first arm 415 of the device 410 is engaged with the tab 491 of the other article 490 and provides a snap-fit between the device and the other article 490. In other words, engagement between the device 410 and other article 490 is via a snap-fit. It will therefore be appreciated that, when the device 410 is received in the other article 490, as shown in FIG. 4, engagement via the snap fit between the first protrusion 421 and the tab 491 will prevent removal of the device 410 from the article 490. In other words, engagement between the first protrusion 421 and the tab 491 prevents the device 410 from being moved relative to (or removed from) the other article 490. Movement of the device 410 relative to the other article 490 may therefore be possible, in some examples, after the engagement between the first protrusion 421 and the tab 491 of the other article 490 is released. This will now be described with reference to FIGS. 5 and 6.

Figures 5, 6A:
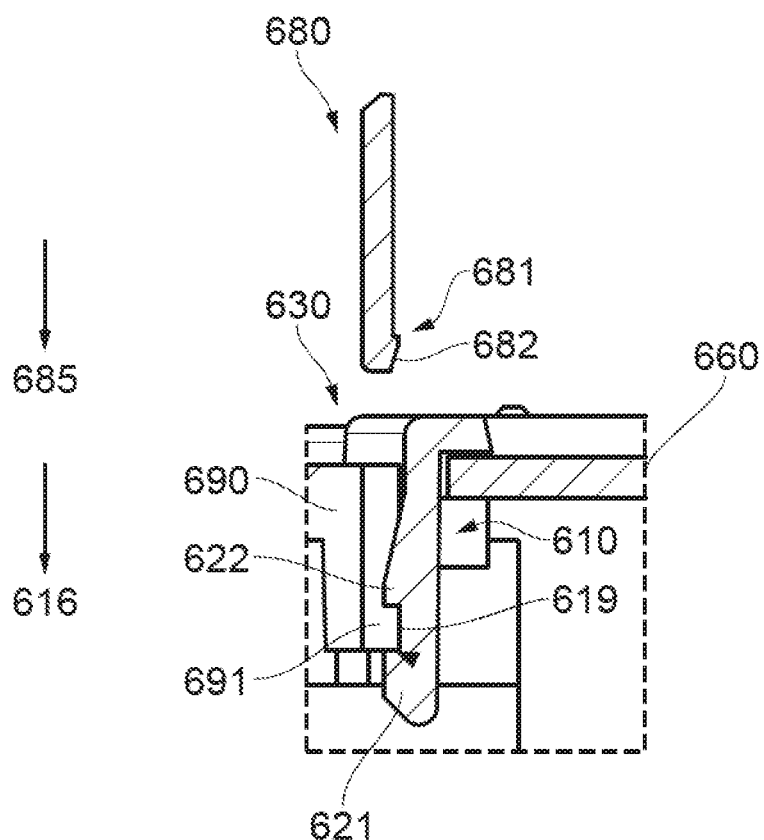
FIG. 5 is a flowchart of an example method.
FIG. 6A-6E schematically show the process of moving an example device relative to another article.

FIG. 5 depicts an example method 500 which is a method of moving the device (such as the device 110, 210 or 410) relative to another article. The method 500 may be a method of removing the device (such as the device 110, 210 or 410) from another article. The method comprises, at block 502, engaging a release tool with the second protrusion of the first arm to retain the device relative to the release tool, engagement between the release tool and the second protrusion causing the first protrusion to disengage from the other article. The method then comprises, at block 504, moving the release tool with the device retained thereto, relative to the other article. Block 502 may comprise inserting the release tool between the device and the other article.

Block 502 may comprise receiving part of the release tool in a space (such as the spaces 119, 219, 419) such as the space between the first and second protrusions of the first arm so as to retain the retaining device in the release to via a snap fit between the second protrusion and the part of the release tool received in the space between the first and second protrusions.

Block 502 may comprise engaging the release tool with the second protrusion via a snap-fit. Moving, at block 504, the release tool may comprise removing the device from the other article. This process will now be described with reference to FIGS. 6A-E.

FIG. 6A depicts the first end 630 of a retaining device 610 (such as any of the retaining devices as described above) being retained relative to another article 690 (e.g. as described with reference to FIG. 4). The device 610 is shown retaining an article 660 (e.g. a window or other device as described above). The device 610 is engaged with the other article 690 (which, as described above, may be a platen of a printing system). More specifically, a tab 691 of the other article 690 is located in the space 619 in between the first and second protrusions 621, 622 of the device 610. FIG. 6A shows a release tool 680 being moved towards the device 610 and the article 690. As also shown in FIG. 6A, the release tool 680 comprises a distal end, the distal end comprising a tapered portion 682 and a lip 681. In this example the lip 681 is, at least in part, defined by the tapered portion 682.

Figure 6C:
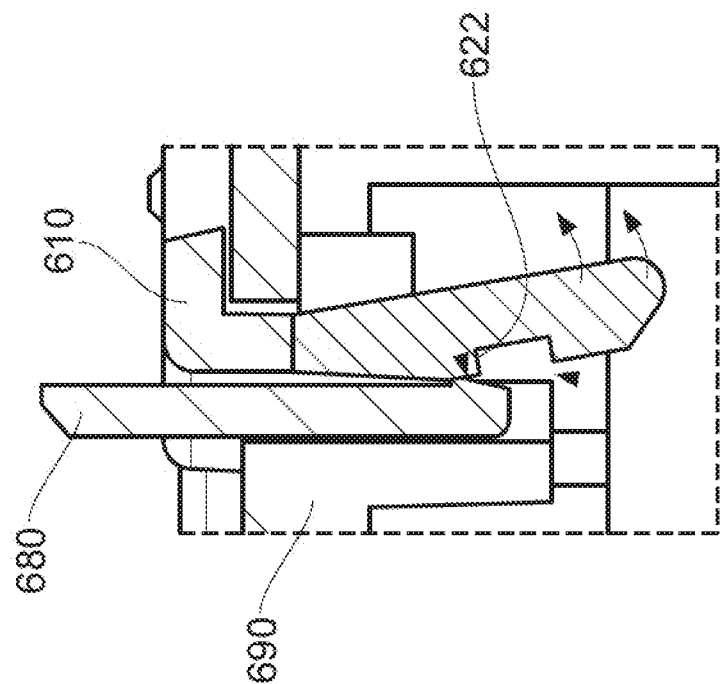
Figure 6B:
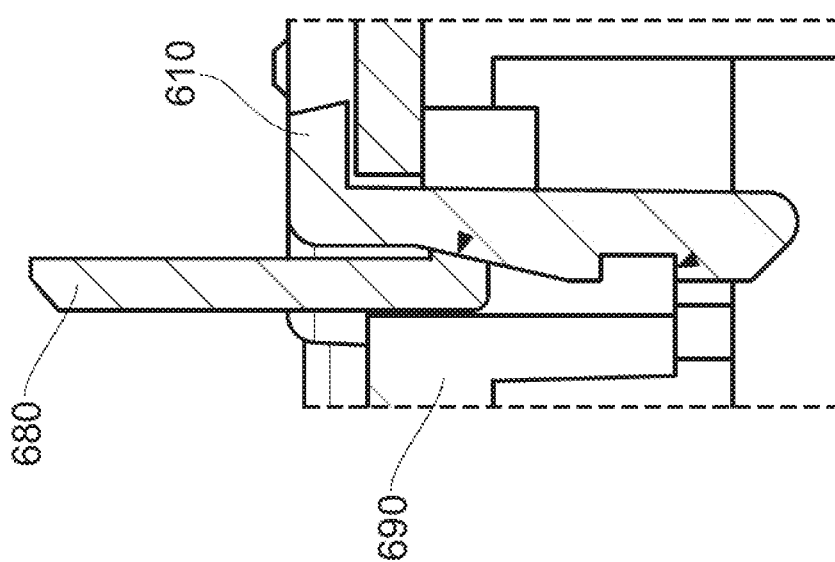

FIG. 6B shows the release tool 680 engaged with the device 610. More specifically, as the release tool 680 is brought downward (relative to FIG. 6, e.g. moved in the first direction), e.g. in the direction 685, the release tool 680 will engage the second protrusion 622 of the device 610. FIG. 6B shows the release tool 680 as it has just engaged the second protrusion 622 of the device 610. As the second protrusion 622 comprises a sloped surface as the release tool 680 moves down the sloped surface, this will either cause the release tool to deform away from the slope, or cause the first arm 615 of the device 610 to deform away from the release tool 680. IT will therefore be appreciated that in some examples the taper 682 is complementarily shaped relative to the sloped surface of the second protrusion 622. As the release tool 680 is received and/or inserted in between the device 610 and the other article 690, the release tool 680 is unable to deform away from the device 610 (since it is prevented from doing so via abutment with the other article 690. Insertion of the release tool 680, e.g. engagement with the second protrusion 622, will therefore urge the first arm 615 away from the release tool (and, in this example, away from the other article). This is shown in FIG. 6C.

FIG. 6C depicts the release tool 680 having moved further downward (e.g. in the first direction) relative to its position shown in FIG. 6B. In FIG. 6C the release tool 680 is engaged with the second protrusion 622 at a position further along the slope in the first direction. As shown in FIG. 6C, the engagement between the release tool 680 and the second protrusion 622 has urged the first arm 615 away from the release tool 680 (and in this example, away from the other article 690). As also shown in FIG. 6C, engagement between the release tool 680 and the second protrusion 622 has urged the first arm 615 away from the other article 690 such that the first protrusion 621 has disengaged from the other article 690 (or the tab 691 thereof). In this example, this is in part facilitated by the tapered portion 682 of the release tool 680. FIG. 6C therefore depicts the instant when the release tool 680 is engaged with the second protrusion 622 to disengage the device 610 from the other article 690, but when the device 610 is not engaged with the release tool 680.

Figure 6E:
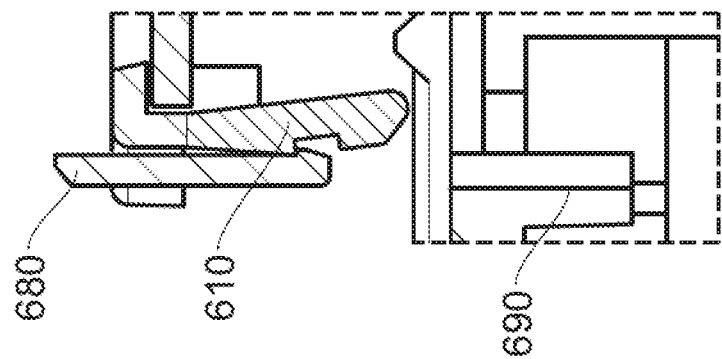
Figure 6D:
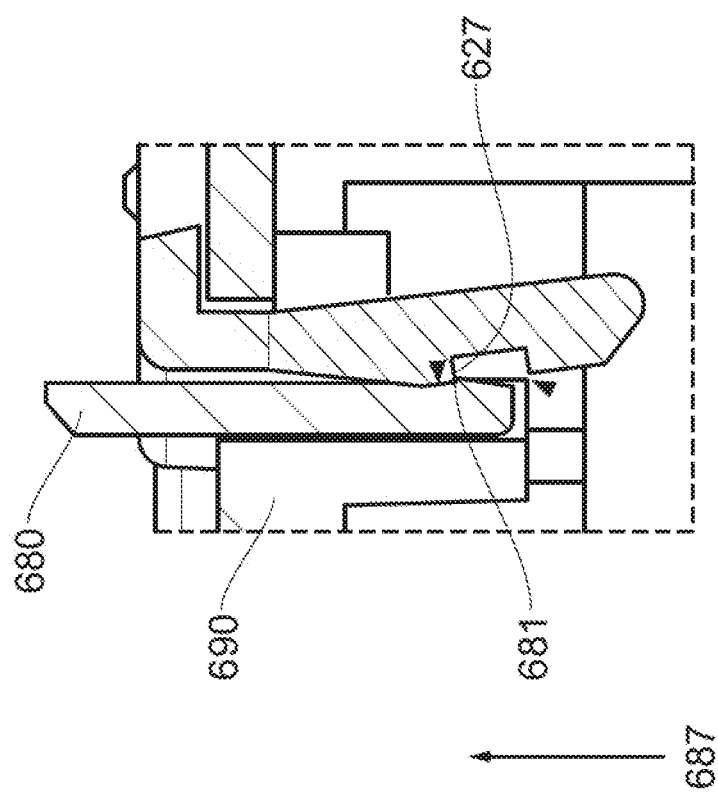

FIG. 6D depicts the release tool 680 having moved further downward (e.g. in the first direction) relative to its position shown in FIG. 6C. As FIG. 6C shows, the release tool 680 has engaged the second protrusion 622 of the device 610 such that the device 610 is retained to the release tool 680, e.g. via a snap fit. Movement of the release tool 680, when in the configuration shown in FIG. 6C, will therefore move the device 610. More specifically, the lip 681 of the release tool 680 has engaged the shoulder 617 such that movement of the release tool 680 in the upward (relative to FIG. 6D) direction 687 (the direction opposite the direction 685) will cause the device 610 to move in the direction 687. This may disengage the device 610 from the apparatus 690 (in the case of the device 110 which is not otherwise attached to the device) or cause the device 610 to pivot (e.g. in the direction of the arrow 270 with reference to FIG. 3) about the pivot axis defined by the hinge (in the case of the device 210 being hingedly attached to the other article 690). In other words, the process described with reference to FIGS. 6A-6E may facilitate movement of the device 610 with reference to the other article 690 and, in some examples, may facilitate removal of the device 610 from the other article 690.

FIG. 6E shows the device 610 having been removed from the other article 690. For example, movement of the release tool 680 in the direction 687 may have disengaged the device 610 from the article 690 such that a user was able to grasp the device 610 and remove it from the article 690. The release tool 680 may therefore be utilised to disengage the device 610 from another article 690 so that a user may separate the device 610 from the other article 690.

Figure 7B:
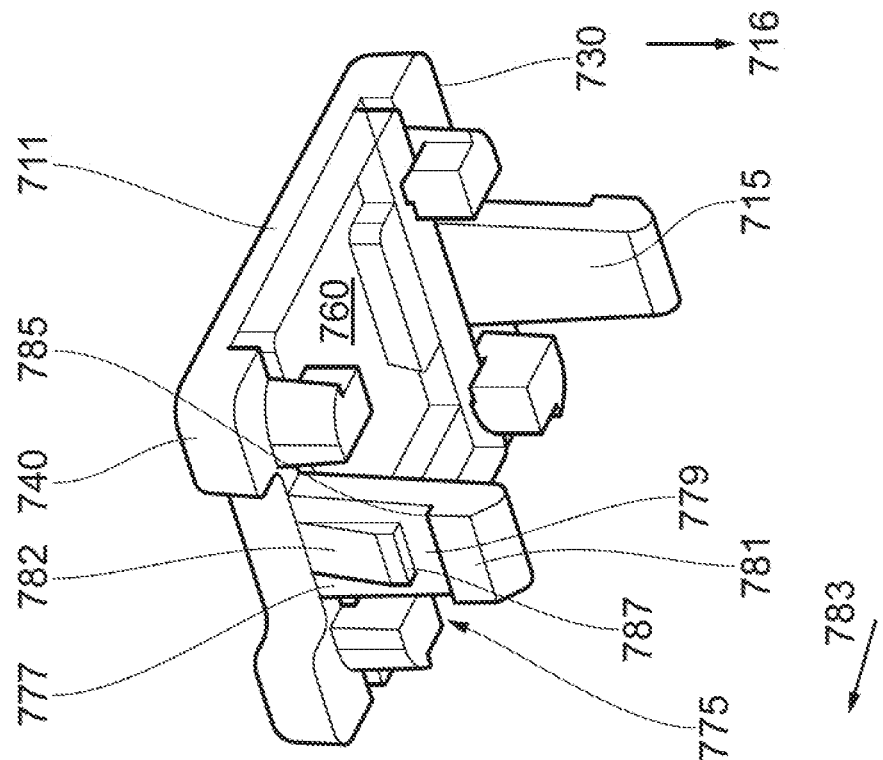
FIGS. 7A and 7B are, respectively, perspective topside and underside views of an example device.
Figure 7A:
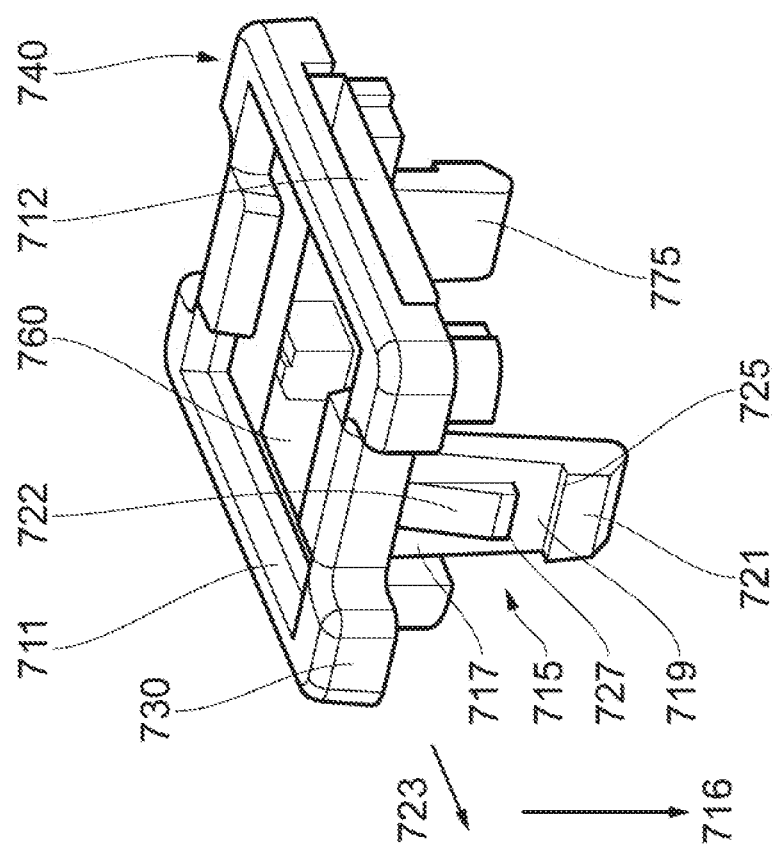

FIGS. 7A and 7B respectively show a perspective view of the top of a first end 730 of a retaining device 710, and an underside view of a second end 740 of the retaining device 710. As with previously described retaining devices, to avoid unnecessary repetition of text, like features are denoted with the same references numerals but increased by a factor of 100.

The retaining device 710 comprises a retaining feature 712 that is to retain an article 760 (depicted in FIGS. 7A and 7B as a window). The retaining feature 712 of this example are depicted similarly to that shown in the example of FIGS. 2A and 2B, but it will be appreciated that this is for illustrative purposes only and other retaining features may be used in other examples.

The device 710 comprises a first arm 715 and a second arm 775. The first arm 715 and the second arm 775 project in a first direction 716. In other words, the first and second arms 715, 775 may comprise a dimension (e.g. a length or depth) extending in the first direction 716, or may each comprise a part of the device 710 that projects away from a body 711 of the device in the first direction 716. The first arm 715 comprises a first face 717 and the second arm 775 comprises a first face 777. For example, the first face 717 of the first arm 715 and the first face 777 of the second arm 775 each comprise a plane, and the first direction 716 is parallel to each plane (or contained in the plane). The first arm 715 comprises a first protrusion 721 and a second protrusion 722. The second arm 775 comprises a third protrusion 781 and a fourth protrusion 782. The first protrusion 721 extends away from the first face 717 of the first arm 715 and the third protrusion 781 extends away from the first face 777 of the second arm 775. Each of the first protrusion 721 and the third protrusion 781 is to engage another article to retain the device 710 relative to the other article. The second protrusion 722 is spaced part from the first protrusion 721 in the first direction 116 and extends away from the first face 717 of the first arm 715. The fourth protrusion 722 is spaced part from the third protrusion 721 in the first direction 716 and extends away from the first face 777 of the second arm 775. In other words, the first face 717 of the first arm 715 comprises a plane defining a perpendicular axis 723, being an axis (and therefore a direction) perpendicular to the first face 717 of the first arm 715 and facing away from the device 710 (and the first end 730 thereof), and each of the first and second protrusions 721, 722 extends away from the first arm 715 in the perpendicular direction 723. The first face 777 of the second arm 775 comprises a plane defining a perpendicular axis 783, being an axis (and therefore a direction) perpendicular to the first face 777 of the second arm 775 and facing away from the device 710 (and the second end 740 thereof), and each of the third and fourth protrusions 781, 782 extends away from the second arm 775 in the perpendicular direction 783. The width of the second and fourth protrusions 722, 782 increases in the first direction 716 so that the second and fourth protrusions each 722, 782 comprise a sloped surface. The width of the second and fourth protrusions 722, 782 may be defined as the dimension of the protrusion in the respective perpendicular directions 723, 783 and therefore the dimension of these protrusions 722, 782 respectively increase in the first direction 716 to provide the sloped surface. As shown in FIGS. 7A and 7B, the width of the second and fourth protrusion 723, 783 may increase in the first direction, e.g. toward the first protrusion 121 (e.g. the further along the first direction the more increased width (in the parallel direction). The width of the second and fourth protrusions 723, 783 may therefore increase in the direction that the first and second arms 715, 775 protrude away from a body 711 of the device 710. Although each sloped surface of the is depicted in this example as a linear slope, so that the second and fourth protrusions resemble a triangular prism, other examples may feature a second and/or fourth protrusion of another shape, for example the slope of the second and/or fourth protrusion may not be linear and in one example the second and/or fourth protrusion may be of a hemispherical shape. In some examples the second and/or fourth protrusion may comprise a cammed surface, or be shaped so as to provide a cammed surface, such that a camming action is provided when a release tool engages the cammed surface of the second and/or fourth protrusion so as to urge the first and/or third protrusions out of engagement with the other article.

In this example the first and second arms are oriented so that their respective first faces, and therefore the protrusions, face away from each other, and face away from a centre of the device. However, in other examples the first and second arms may be oriented so that their respective first faces, and therefore the protrusions, face toward each other.

The first and second protrusions 721, 722 define a space 719 therebetween for receipt of part of another article, and the third and fourth protrusions 781, 782 define a space 779 therebetween for receipt of part of another article. The first and third protrusions 721, 781 may each be to engage part of the other article be receiving part of the other article in the spaces 719, 779, and the engagement between the part of the other article and the first and third protrusions may be via a snap fit. For this purpose, in some examples, the first and second arms 715, 775 may be naturally biased away from (a centre of) the device 710. In examples where the first faces of the first and second arms 715, 775 (and therefore the protrusions) face each another, the two arms may be biased toward a centre of the device (e.g. to facilitate the snap fit as described above). In other words, the protrusions 721, 781 may each respectively define a shoulder 725 of the first arm 715 and a shoulder 785 of the second arm 775 such that when the device is retained by another article, part of the other article may be received in the spaces 719, 779 and may abut the shoulders 725, 785 of the first and second arms 715, 775, respectively. In this example, if the device 710 were attempted to be moved relative to the other article, engagement between the other article and the shoulders 725, 785 may prevent this relative movement. In other words, the engagement between the first and third protrusions 721, 771 and the other article may, in some examples, need to be disengaged before relative movement between the device 710 and other article is permitted. As will also be explained in more detail below, engagement between a release tool and the second (and fourth) protrusion may cause the first (and third) protrusion and other article to disengage to facilitate relative movement between the device and the other article. Similarly, the second and fourth protrusions 722, 782 each respectively comprises a shoulder 727, 787 that, as will be explained below, may be to engage a release tool to facilitate movement of the device 710 by moving the release tool. In other words, when part of a release tool engages the shoulders 727, 787 of the second and fourth protrusions 722, 782 movement of the release tool may cause the device 710 to move.

In the example of FIGS. 7A and 7B the first and second arms 715, 775 are provided at opposing ends 730, 740 of the device 710. For example, the first arm 715 is provided at a first end 730 of the device 710 and the second arm 775 is provided at a second end 740 of the device 710 and the first and second ends 730, 740 oppose each other. Also in this example, the first face 717 of the first arm 715 and the first face 777 of the second arm 775 face away from each other (and each face away from the device 710 or a body 711 thereof). Consequently, in this example the protrusions 721, 722, 781, 782 all face away from the device 710. However, it will be appreciated that in another example the first faces 717, 777 may face towards one another (and therefore face towards the device 710, or a centre thereof), and in this example the first and second protrusions 721, 722, and the third and fourth protrusions 781, 782 will face each other. In this example shown in FIGS. 7A and 7B the first and third protrusions 721, 781 and the second and fourth protrusions 722, 782 oppose each other.

As will be described below with reference to FIGS. 8 and 9, simultaneous engagement between a two-pronged release tool and the second and fourth protrusions 722, 782 may urge the arms 715, 775 towards one another (and toward the centre of the device 710). In other words, engagement between a release tool and the second and fourth protrusions may urge the arms towards each other, against their natural bias. As will however be appreciated, in examples where the first faces 717, 777 face each other simultaneous engagement between a release tool and the second and fourth protrusions 722, 782 may urge the arms 715, 775 away from one another (against their natural bias), and therefore away from (a centre of) the device 710.

Figure 8A:
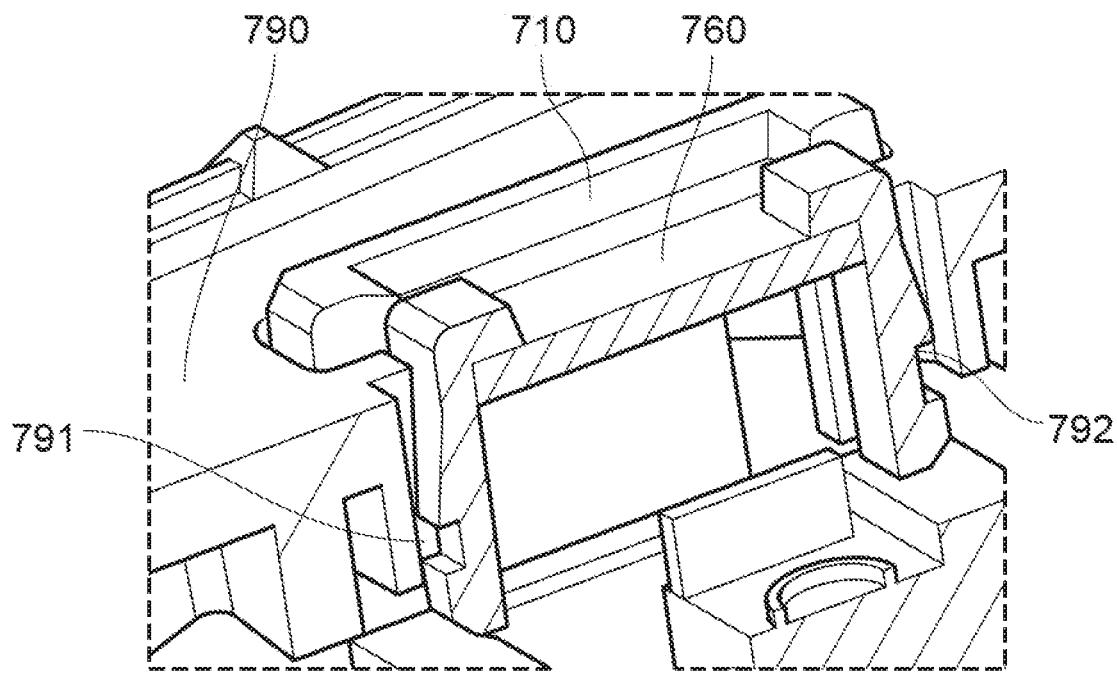
FIGS. 8A and 8B are, respectively, a perspective and side cross-section of the device of FIGS. 2A and 2B retained in another article.
Figure 8B:
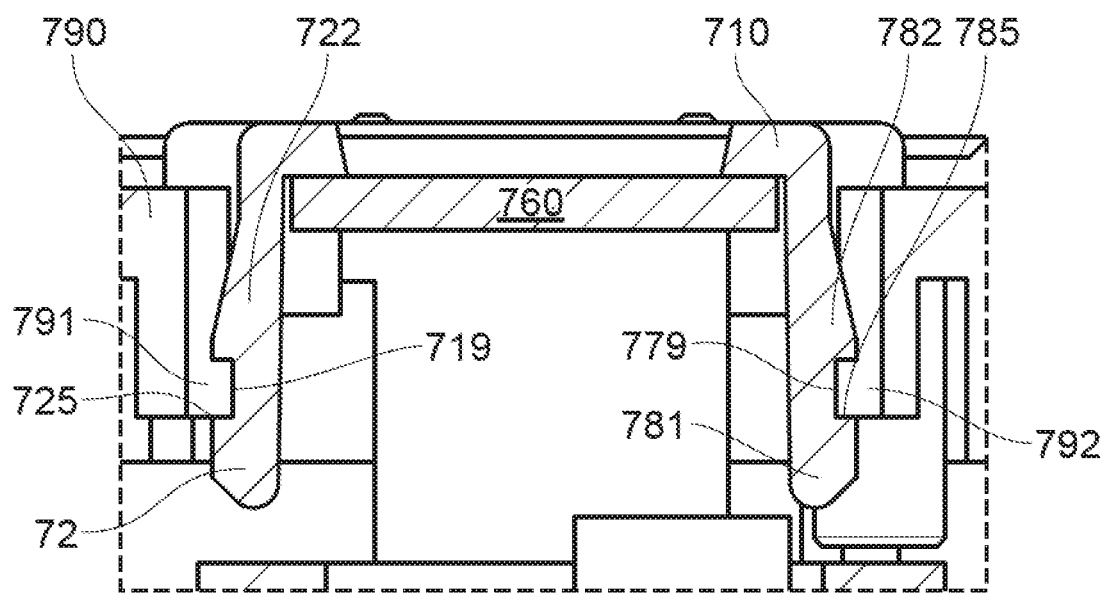

FIGS. 8A and 8B show the device 710 retaining an article 760 and being retained in another article 790. As shown in these figures, the article 790 comprises a pair of tabs, a first tab 791 and a second tab 792. When the device 710 is retained in the other article 790 the first tab 791 is received in the space 719 between the first and second protrusions 721, 722 and the second tab 792 is received in the space 779 between the third and fourth protrusions 781, 782. In this way (and as can be more clearly seen from FIG. 8B) a snap fit is provided between the first and third protrusions 721, 781 and the first and second tabs 791, 792, respectively. To facilitate the snap-fit arrangement the two arms 715, 775 may be naturally biased away from (a centre of) the device to ensure that when the device 710 is received in the other article 790 the arms are naturally biased into engagement with the other device 790. In this way, with reference to FIG. 8B, attempted removal of the device 710 from the other article 790, by pulling the device 710 up and out of the other article 790, would be prevented by the respective engagement between the first and third protrusions 721, 781 and the first and second tabs 791, 792. More specifically, engagement between the shoulder 725 of the first arm 715 and the first tab 791 and the shoulder 785 of the second arm 775 and the second tab 792 will resist any attempt to remove the device 710 from the other article 790 (e.g. upwards, with reference to FIG. 8B, and out of the other article 790). The first and third protrusions 721, 782 (or the shoulders thereof) therefore each provide a snap-fit between the device 710 and the other article 790. The example device 710 may therefore be retained relative to the other article 790 via two snap fits, one provided by each arm. Relative movement between the device 710 and the other article 790 may therefore be restricted and/or prevented, until such time as the engagement between the first protrusion 721 and the (first tab 791 of the) other article, and the engagement between the third protrusion 781 and the (second tab 792 of the) other article are both released.

Referring back to FIG. 5, the method 500 may be a method of moving (or removing) the article 710 relative to the other article 790. In one example, engaging, at block 502, may comprise engaging the release tool with the fourth protrusion 782 of the second arm 775 to retain the device 710 to the release tool, wherein engagement between the release tool and the second and fourth protrusions 722, 782 causes the first and second arms 715, 775 to bend towards one another causing the first and third protrusions 721, 781 to disengage from the other article 790. In another example, engaging, at block 502, may comprise receiving a first part of the release tool in the space 719 between the first and second protrusions, and receiving a second part of the release tool in the space 779 between the third and fourth protrusions so as to retain the retaining device 710 to the release tool via a snap fit between the second protrusion 722 and the first part of the release tool and via a snap fit between the fourth protrusion 782 and the second part of the release tool. This will now be described with reference to FIGS. 9A-9C.

Figure 9A:
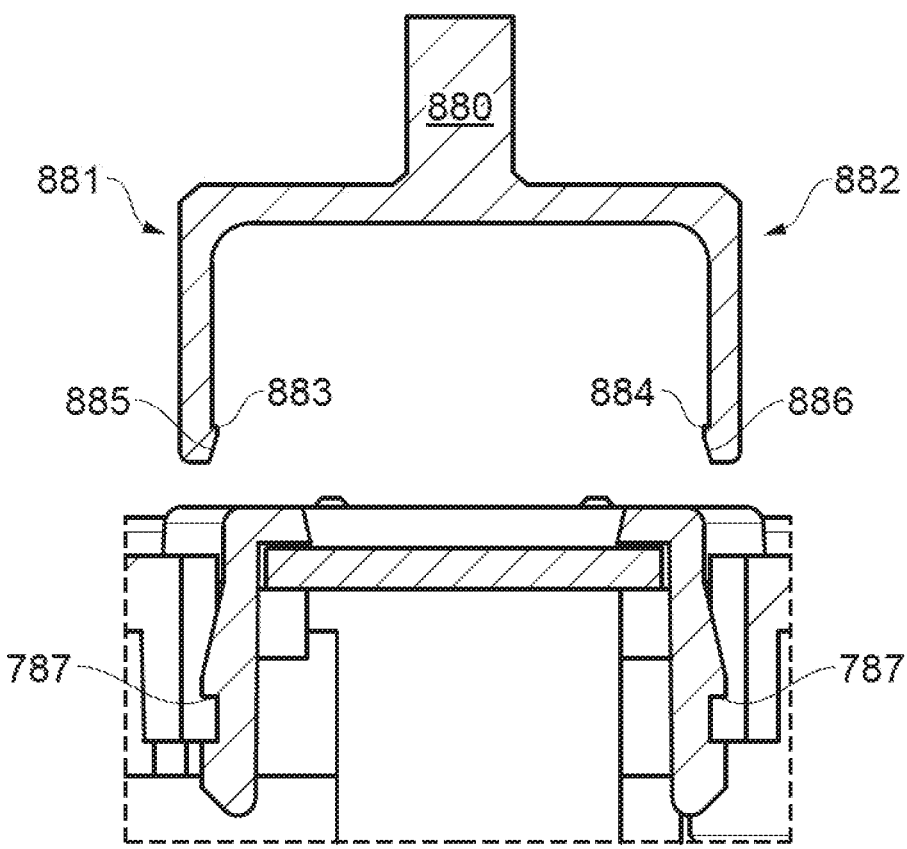
FIGS. 9A-9C schematically show the process of moving an example device relative to another article.

FIG. 9A depicts the retaining device 710, as shown in FIG. 8B. FIG. 9A also shows a release tool 880. The release tool 880 comprises first and second arms, 881, 882 and is therefore a two-pronged release tool. The first and second arms are shaped so as to each fit within a cavity between the other article 790 and the second and third protrusions 722, 782 of the device 710, respectively, as will be explained with reference to FIG. 9B. The first arm 881 of the release tool comprises a first lip 883 and a tapered portion 885 at a distal end thereof. The tapered portion 885 at least in part defines the first lip 883. The second arm 882 comprises a second lip 884 and a tapered portion 886 at a distal end thereof. The tapered portion 886 at last in part defines the second lip 884.

Figure 9B:
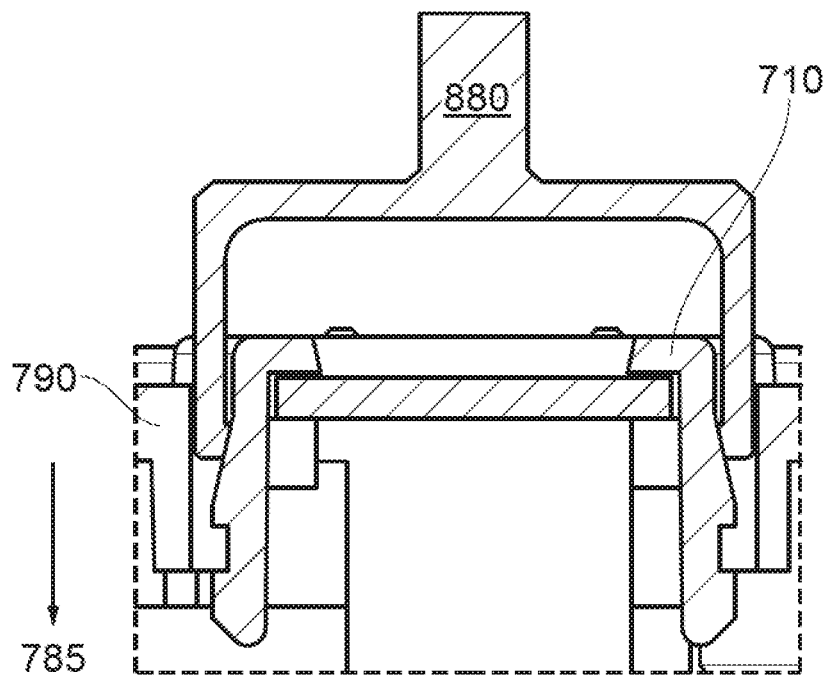

FIG. 9B shows the release tool 880 engaged with the device 710. More specifically, as the release tool 880 is brought downward (relative to FIG. 9B, e.g. moved in the first direction), e.g. in the direction 785, the release tool 880 will engage the second and fourth protrusions 722, 782 of the device 710. More specifically, the distal ends of the first and second arms 881, 882 of the release tool 880 will engage the second and fourth protrusions 722, 782. The two arms of the release tool 881, 882 are therefore sized and shaped so as to fit in between the cavity, or gap between the device 710 and the other article 790. FIG. 9B shows the release tool 880 as it has just engaged the second and fourth protrusions 822, 882 of the device 810, and also shows that the tapered portions 885, 886 of the two arms 881, 882 have engaged the second and fourth protrusions 822, 882. As the second and fourth protrusions 722, 782 each comprise sloped surfaces, as the arms of the release tool 880 moves down the sloped surfaces, this will either cause the arms of the release tool to deform away from the slope, or cause the first and second arms 715, 775 of the device 710 to deform away from the release tool 880. As the release tool 880 is received and/or inserted in between the device 710 and the other article 790, the release tool 880 is unable to deform away from the device 710 (since it is prevented from doing so via abutment with the other article 790. Insertion of the release tool 880, e.g. engagement with the second and fourth protrusions 722, 782, will therefore urge the first and second arms 715, 775 away from the release tool (and, in this example, away from the other article) and toward each other, against their natural bias. As has been described above with reference to FIGS. 6C and 6D, further downward movement of the release tool 880 will cause the first and second protrusions 721, 781 to disengage from the other article 790 (or the tabs 791, 792 thereof). This is, in part, facilitated by the tapered portion 682 of the release tool 680, and will cause the release tool 880 to engage the device 710.

Figure 9C:
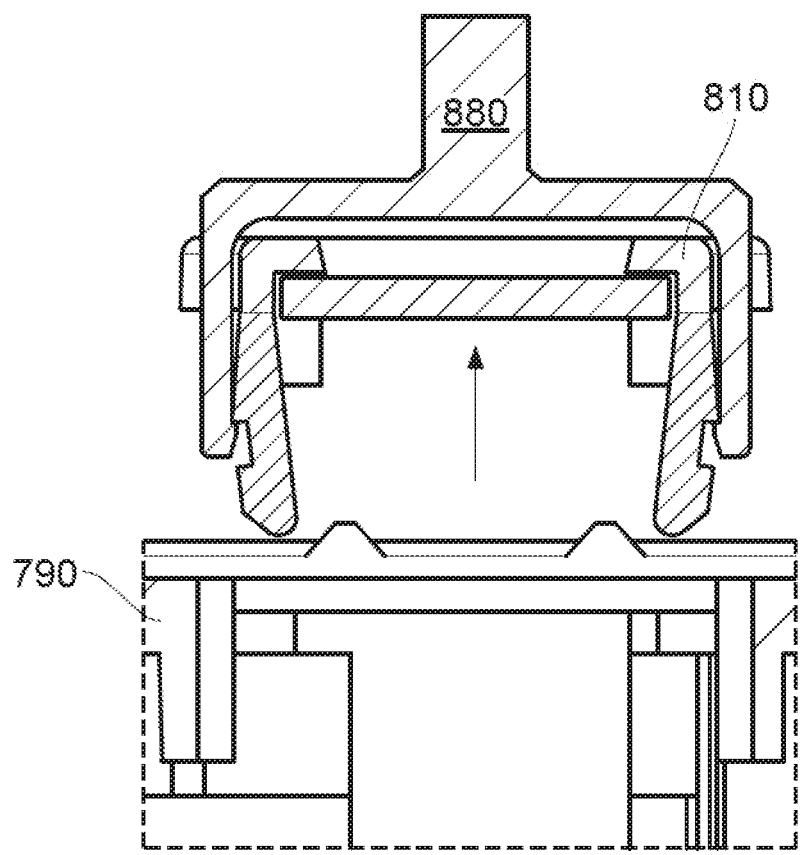

FIG. 9C shows the release tool 880 (and article 710 retained thereto) being removed from the other article 790, the release tool 880 having been moved sufficiently to urge the arms towards one another and to engage the (second and fourth protrusions of the) device 710. As is shown in FIG. 9C, the first lip 883 has engaged the second protrusion 722 and the second lip 884 has engaged the fourth protrusion 782, thus retaining the device 710 in the release tool 880. More specifically, the lips 883, 884 have each engaged the respective shoulders 727, 787 of the second and fourth protrusions. It will be appreciated that the release tool 880 has effectively urged the arms towards each other so that its arms can engage the second and fourth protrusions of thereof. The natural bias of the arms 715, 775 will exert a force against the two arms of the release key 880 which serves to retain the device 710 within the release key as is shown in FIG. 9C. Movement of the release tool 880, when in the configuration shown in FIG. 9C, will therefore move the device 710.

Figure 10B:
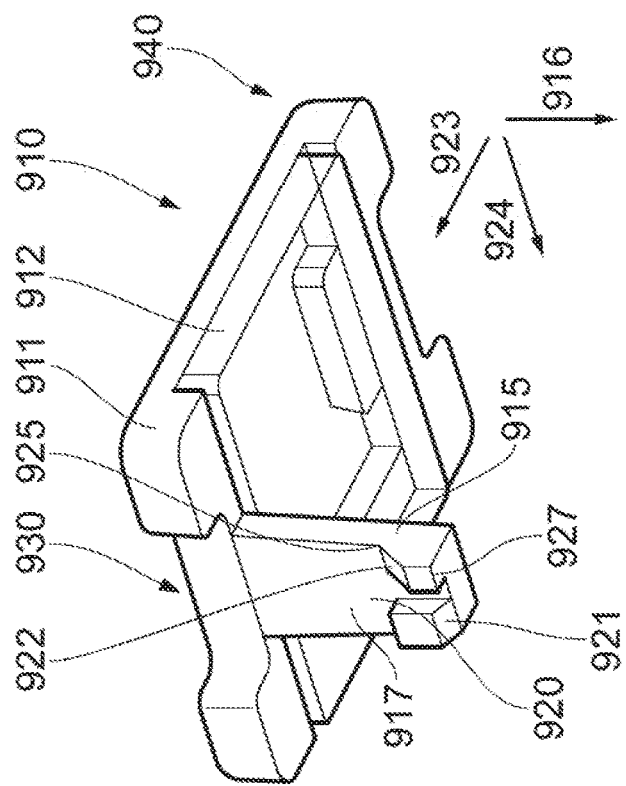
FIGS. 10A and 10B are, respectively, perspective topside and underside views of an example device.
Figure 10A:
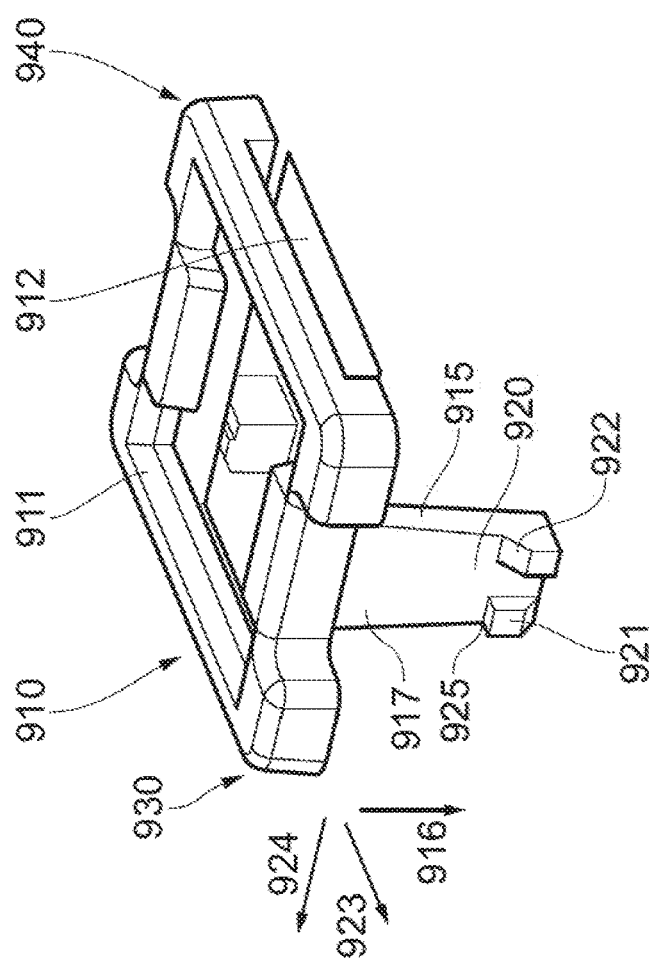

FIGS. 10A and 10B respectively show perspective views of a topside and an underside of another example of a retaining device 910. The example device 910 shown in FIGS. 10A and 10B is substantially identical to the device shown in FIGS. 1A and 1B (and, to avoid unnecessary repetition of text, like features are denoted with the same references numerals but increased by a factor of 100) but for a number of features that will now be described.

The device 910 comprises a first arm 915, and first and second protrusions 921, 922 as described above with reference to FIG. 1. However, unlike the device 110 in the FIG. 1 example, where the second protrusion 122 is spaced apart from the first protrusion 121 in the first direction 116 (corresponding to the first direction 916 in the example of FIG. 10), the second protrusion 922 and the first protrusion 921 of the device 916 in this example are at corresponding positions in the first direction 916, in a side-by-side arrangement. The first and second protrusions 921, 922 are at corresponding positions in that they are positioned on the first arm 915 at the same distance or depth from the body 911 of the device in the first direction 916. In this way, the second protrusion 922 may be aligned with the first protrusion 921 in a second, transverse direction 924 that is perpendicular to the first direction 916 (and the perpendicular direction 923).

The first and second protrusions 921, 922 are spaced apart from each other in the second direction 924. Further, the first and second protrusions 921, 922 define a space 920 thereabove for receipt of part of another article. Similarly to the arrangements described above with reference to FIGS. 1 and 4, the first protrusion 921 may be to engage part of the other article by receiving part of the other article in the space 920, and the engagement between the part of the other article and the first protrusion may be via a snap fit. To facilitate this, the first protrusion 921 may define a shoulder 925 of the first arm 915 (and therefore of the device 910) such that when the device is retained by another article, part of the other article may be received in the space 920 and may abut the shoulder 925 of the first arm 915. In this example, if the device 910 were attempted to be moved relative to the other article, engagement between the other article and the shoulder 925 of the first arm 915 may prevent this relative movement. In other words, the engagement between the first protrusion 921 and the other article may, in some examples, need to be disengaged before relative movement between the device 910 and other article is permitted. The other article (not shown) may comprise a platen of a printing system, and the part of the other article that is suitable for engaging the first protrusion 921 may be a tab of the other article which is shaped so as to fit in the space 920 above the first and second protrusions 921, 922, to engage the device 910 with the article.

Engagement between a suitably shaped release tool and the second protrusion may cause the first protrusion and other article to disengage to facilitate relative movement between the device and the other article. The second protrusion 922 comprises a shoulder 927 that may be to engage a release tool to facilitate movement of the device 910 by moving the release tool. In other words, when part of a release tool engages the shoulder 927 of the second protrusion 922 movement of the release tool may cause the device 910 to move, and in some examples this will allow removal of the device from the other article.

Although not shown in FIG. 10, the device 910 may comprise at least one tab (such as the four tabs 212*a*, 212*b*, 212*c*, 212*d* described with respect to FIG. 2) to reduce or prevent relative movement between an article being retained in a slot 912 and the device 910.

While the first arm 915 has been described above with reference to FIG. 10 as having only one first protrusion 921, it will be appreciated that the first arm 915 may include two or more first protrusions 921, e.g. with one of the two or more first protrusions 921 on each side of the second protrusion 922, e.g. in a symmetrical configuration about a centrally located second protrusion 922.

As described above with reference to examples shown in other figures, the device 910 may comprise an attachment means to enable the device 910 to be attached to another article (such as a platen of a print apparatus), for example a second end 940 of the device opposite the end 930 at which the first arm 915 is located may comprise a hinge, or pivot, and the device may be moveable relative to the other article about the pivot.

Alternatively, the device may comprise in addition to the first arm 915, a second arm (not shown) substantially as described above with respect to FIG. 7 except that the third protrusion and fourth protrusions (not shown) of the second arm are positioned at corresponding positions in the first direction 916 in a side-by-side arrangement.

Figure 11:
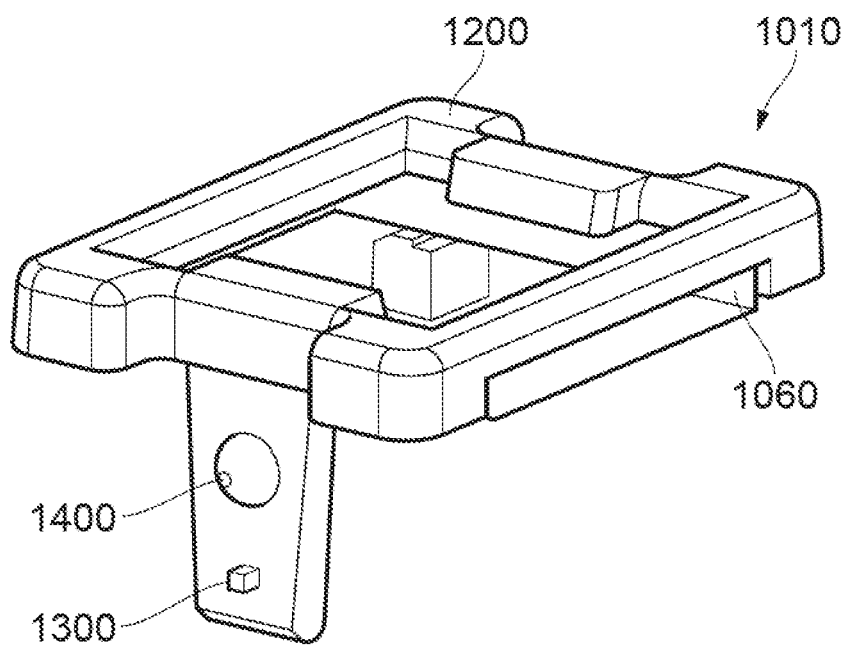
FIG. 11 shows an example apparatus.

FIG. 11 shows a perspective view of an example apparatus 1010. The apparatus is to retain a component 1060 and comprises a structure 1200 to retain the component 1060. The component 1060 may be any suitable component such as a mechanical component (such as an object, for example a window) or an electrical component (e.g. a device such as a sensor) or a combination thereof, such as an electromechanical device. The apparatus 1010 comprises a first engagement feature 1300 and a second engagement feature 1400. The first engagement feature 1300 is for engaging another article (not shown) to retain the other article to retain the apparatus relative to the article. The second engagement feature 1400 is to release the first engagement feature 1300 (from the other article) when engaged by a release feature, thereby allowing the apparatus to be moved relative to the other article.

The second engagement feature may comprise a raised surface. The second engagement feature may comprise a cammed surface. In one example a camming action between a release feature and the second engagement feature may release the first engagement feature from engagement with another article, e.g. via a camming action. The first engagement feature may comprise the first or third protrusion as described above. The second engagement feature may comprise the second or fourth protrusion as described above.

In one example therefore the apparatus 1010 may comprise any one of the devices 110, 210, 410, 610, 710, 810, 910 as described above with reference to FIGS. 1, 2, 4, 6, 7, 8 and 10, respectively.

In another example the second engagement feature is a release mechanism for the first engagement feature. For example the first engagement feature may be a retractable protruding tab that is to engage with a correspondingly sized and shaped recess of another article to retain the apparatus relative to the other article, and engagement with the second engagement feature may cause the protruding tab to retract to allow movement of the apparatus relative to the other article. The second engagement mechanism may therefore comprise a switch to release the first engagement mechanism. The first and second engagement features may each comprise a snap-fit arrangement to engage another article via a snap-fit.

Figure 12:
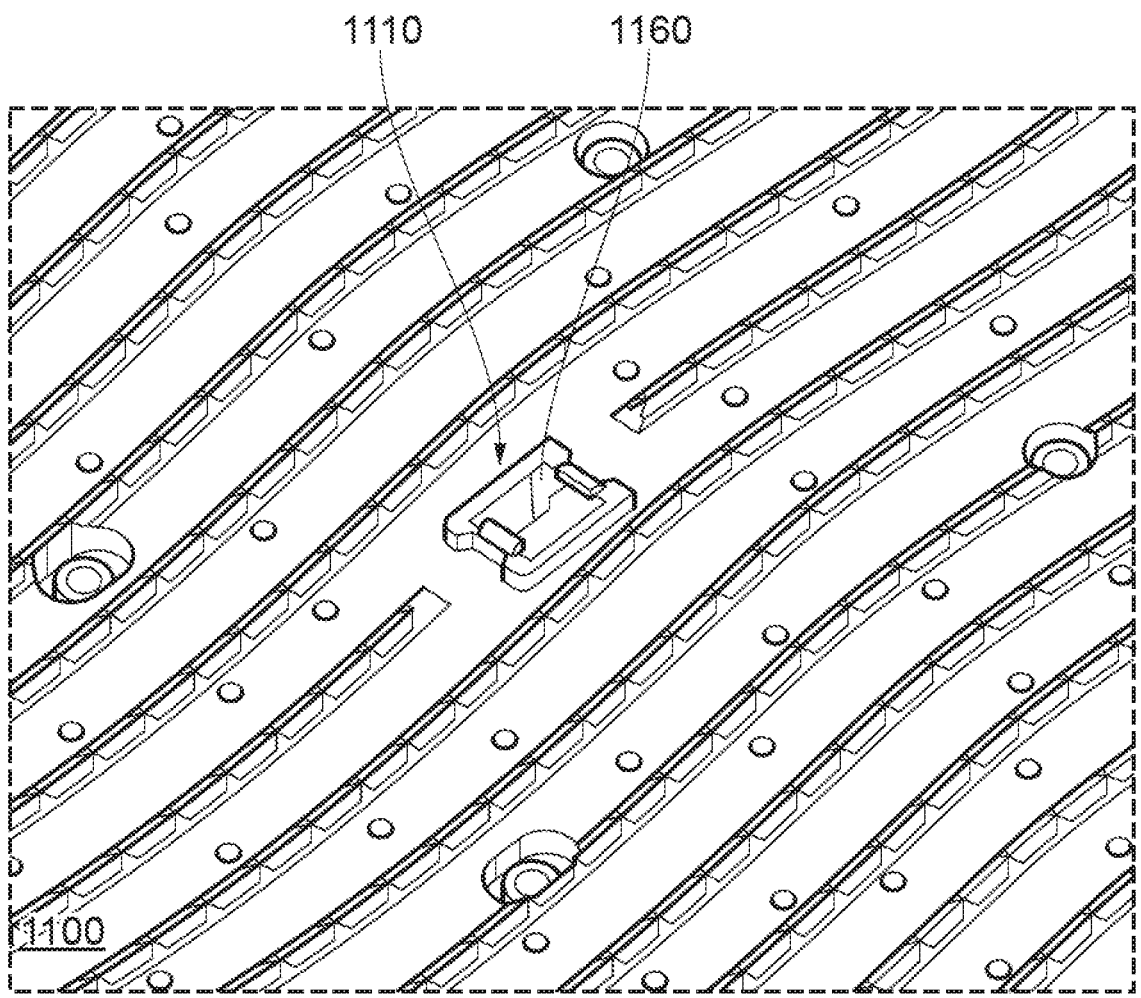
FIG. 12 shows an example apparatus retained in another article.

FIG. 12 shows an apparatus 1111 retained in a platen 1100 of a printing system. The apparatus 1111 is retaining another article 1160. The apparatus 1111 may comprise any one of the devices 110, 210, 410, 610, 710, 810, 910 or the apparatus 1010 as described above with reference to FIGS. 1, 2, 4, 6, 7, 8, 10 and 11, respectively. The platen 1100 may comprise the other article 290, 490, 690 or 790 as described above with reference to FIGS. 2, 4, 6 and 7, respectively. Accordingly the platen may comprise a protrusion (such as the tab 491, or one of the tabs 791, 792). In one example the other article comprises a window, for example a window comprising a glass or plastics material. The window may be for an optical sensor of the printing system. Therefore, in one example the apparatus 1111 may be located in a print zone of the printing system. The platen 1100 may therefore be located in a print zone of the printing system. The platen 1100 may comprise a cavity to receive the apparatus 1111 may be to receive an optical sensor, and therefore the device may be received in the cavity to protect the optical sensor. In examples where the other article 1160 is a window the apparatus 1111 may therefore be to retain a window to protect an optical sensor of a printing system.

Some example herein therefore provide a device capable of retaining an article that may be easily and robustly removed from another article and may also be easily and robustly replaced therein. For example, the device may be removed from the other article so that the article retained therein may be removed, e.g. to be cleaned or replaced. In the particular example (which is not limiting to the device), the device may be to retain a window and the other article may be a platen of a printing system. As described above the window may be to protect an optical sensor of a printing system. N these examples the examples described herein may enable a user of the printing system to reliably perform the correct maintenance by cleaning or replacing the window without requiring the service of a qualified engineer. The reliability of removal also means that the risk of damage to the window, device, or part of the printing system is reduced or minimized during the maintenance operation. This, in turn, will reduce or minimize the occurrence of a media advance error by ensuring optimal working conditions for the sensor, by maintaining the transparency of the window. In turn, this will lead to a better print quality of print jobs, and may increase the productivity rate of the printing system due to lower system downtimes for performing maintenance.

The present disclosure is described with reference to flow charts and/or block diagrams of the method, devices and systems according to examples of the present disclosure. Although the flow diagrams described above show a specific order of execution, the order of execution may differ from that which is depicted.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A retaining device comprising:
    a retaining feature to retain an article;
    a first arm projecting in a first direction;
    wherein the first arm comprises a first protrusion extending away from a first face of the first arm, the first protrusion being to engage another article to retain the retaining device relative to the other article, and a second protrusion spaced apart from the first protrusion and extending away from the first face of the first arm, wherein the width of the second protrusion increases in the first direction toward the first protrusion so as to provide a sloped surface.

2. A retaining device according to claim 1 wherein the second protrusion is spaced apart from the first protrusion in the first direction, and the space between the first and second protrusions is to receive part of the other article.

3. A retaining device according to claim 1 further comprising:
    a second arm projecting in the first direction;
    wherein the second arm comprises a third protrusion extending away from a first face of the second arm, the third protrusion being to engage the other article to retain the retaining device relative to the other article, and a fourth protrusion spaced apart from the third protrusion and extending away from the first face of the second arm, wherein the width of the fourth protrusion increases in the first direction so as to provide a sloped surface.

4. A retaining device according to claim 3 wherein the fourth protrusion is spaced apart from the third protrusion in the first direction, and the first and second arms are provided at opposing ends of the retaining device.

5. A retaining device according to claim 3 wherein the first face of the first arm and the first face of the second arm face away from each other.

6. A retaining device according to claim 1 further comprising a platen of a printing apparatus, wherein the platen comprises a tab to engage the first protrusion, wherein engagement between the first protrusion and the tab retains the retaining device relative to the platen.

7. A retaining device according to claim 6 wherein the retaining device is hingedly connected to the platen.

8. A method for moving a device relative to another article, the device comprising:
    a first arm projecting in a first direction;
    wherein the first arm comprises a first protrusion extending away from a first face of the first arm, the first protrusion being engaged with another article to retain the retaining device relative to the other article, and a second protrusion spaced apart from the first protrusion and extending away from the first face of the first arm, wherein the width of the second protrusion increases in the first direction toward the first protrusion so as to provide a sloped surface;
    the method comprising:
        engaging a release tool with the second protrusion of the first arm to retain the device relative to the release tool, wherein engagement between the release tool and the second protrusion causes the first protrusion to disengage from the other article; and
        moving the release tool with the device retained thereto, relative to the other article.

9. A method according to claim 8 wherein:
    the second protrusion is spaced apart from the first protrusion in the first direction; and
    engaging the release tool with the second protrusion of the first arm comprises receiving part of the release tool in the space between the first and second protrusions of the first arm so as to retain the retaining device in the release to via a snap fit between the second protrusion and the part of the release tool received in the space between the first and second protrusions.

10. A method according to claim 8, wherein the device further comprises:
    a second arm projecting in the first direction; wherein the second arm comprises a third protrusion extending away from a first face of the second arm, the third protrusion being to engage the other article to retain the retaining device relative to the other article, and a fourth protrusion spaced apart from the third protrusion and extending away from the first face of the second arm, wherein the width of the fourth protrusion increases in the first direction so as to provide a sloped surface;
    the method further comprising:
        engaging the release tool with the fourth protrusion of the second arm to retain the device relative to the release tool, wherein engagement between the release tool and the second and fourth protrusion causes the first and second arms to bend towards one another causing the first and third protrusions to disengage from the other article.

11. A method according to claim 10 wherein:
the second protrusion is spaced apart from the first protrusion in the first direction; the fourth protrusion spaced apart from the third protrusion in the first direction; and
engaging the release tool with the second and fourth protrusions comprises receiving a first part of the release tool in the space between the first and second protrusions, and a second part of the release tool in the space between the third and fourth protrusions, so as to retain the retaining device in the release tool via a snap fit between the second protrusion and the first part of the release tool and a snap fit between the fourth protrusion and the second part of the release tool.

12. A method according to claim 10, wherein the release tool comprises two opposing arms, each arm of the release tool being to engage a respective one of the second and fourth protrusions of the retaining device.

13. An apparatus to retain a component, the apparatus comprising:
a structure to retain the component, wherein the structure comprises:
a first engagement feature for engaging another article to retain the apparatus relative to the article, the first engagement feature located on a first face; and
a second engagement feature to release the first engagement feature when engaged by a release feature, the second engagement feature located on the first face, thereby allowing the apparatus to be moved relative to the other article.

14. An apparatus according to claim 13, wherein the second engagement feature comprises a raised surface.

15. An apparatus according to claim 13 further comprising a printing platen, and wherein the printing platen comprises a protrusion to engage the first engagement feature.

* * * * *